United States Patent [19]
Brac

[11] Patent Number: 4,862,422
[45] Date of Patent: Aug. 29, 1989

[54] METHOD FOR DETERMINING THE GEOMETRY OF A MULTISOURCE SEISMIC WAVE EMISSION DEVICE

[75] Inventor: Jean Brac, Royan, France

[73] Assignee: Insitut Francais du Petrole, Cedex, France

[21] Appl. No.: 159,849

[22] PCT Filed: Jun. 12, 1987

[86] PCT No.: PCT/FR87/00216
§ 371 Date: Apr. 13, 1988
§ 102(e) Date: Apr. 13, 1988

[87] PCT Pub. No.: WO87/07732
PCT Pub. Date: Dec. 17, 1987

[30] Foreign Application Priority Data
Jun. 13, 1986 [FR] France .............................. 86 08538

[51] Int. Cl.$^4$ ............................................. G01V 1/38
[52] U.S. Cl. ........................................ 367/19; 367/20
[58] Field of Search .................. 367/16, 19, 20, 130, 367/23, 106; 181/111

[56] References Cited

U.S. PATENT DOCUMENTS

| | | | |
|---|---|---|---|
| H,388 | 12/1987 | Lloyd | 367/19 |
| 3,962,672 | 6/1976 | Watts et al. | 367/19 |
| 4,087,780 | 5/1978 | Itria et al. | 367/19 |
| 4,124,990 | 11/1978 | Bell et al. | 405/167 |
| 4,559,621 | 12/1985 | Delignieres | 367/19 |
| 4,709,356 | 11/1987 | Ayers | 367/130 |
| 4,727,956 | 3/1988 | Huizer | 181/111 |

FOREIGN PATENT DOCUMENTS 2113391 8/1983 United Kingdom .

Primary Examiner—Thomas H. Tarcza
Assistant Examiner—Ian J. Lobo
Attorney, Agent, or Firm—Antonelli, Terry & Wands

[57] ABSTRACT

Method for determining the geometry of a seismic wave emission device comprising a plurality of seismic sources (S11, S12, S21, etc.) toward by a ship (1) with different transverse and longitudinal offsets. It comprises the isolated triggering of each of the sources (S11, S12, S21, etc.), the detection of acoustic waves coming therefrom by means of proximity sensors (C) arranged at known distances from other sources and optionally from the ship or from a seismic flute, and the recording of detecting signals by means of an acquisition system on board the ship (1). After various corrections of the distances and various processings performed on the signals, parameters (propagation time, phase shiftings) representative of intersource distances are determined and, consequently, the relative coordinates of the sources with respect to each other and their positions with respect to other points. The previous measurements are completed by other measurements related to the immersion depth of different sources. Application to ocean seismic prospection.

11 Claims, 1 Drawing Sheet

METHOD FOR DETERMINING THE GEOMETRY OF A MULTISOURCE SEISMIC WAVE EMISSION DEVICE

The object of the invention is a method for determining the geometry of a multisource seismic wave emission system.

A seismic wave emission system is used for generating seismic waves in a mass of water, which propagate toward the bottom and are reflected or diffracted by the roughnesses of the seabed. The waves sent back to the surface are picked up by sets of hydrophones distributed along one or more seismic cables towed by a ship. The seismic signals they produce are transmitted to a seismic laboratory in order to obtain recordings representative of the seabed configuration.

The seismic sources used are, for example, air guns, water guns, or other sources which are triggered simultaneously or sequentially. The purpose of these combined triggerings is to increase the acoustic power dissipated, to improve the shape of the resulting emitted pulse or signature, or to obtain a more directional emission diagram. The effect obtained by sequential triggering depends very precisely on the configuration of the sources used and the time intervals separating the emissions.

It is thus important to know the geometry of the emission system, i.e. the relative disposition of all the seismic sources with respect to each other.

The emission system comprises, for example, several subsets each composed of a line of several seismic sources disposed at intervals chosen along a towed "umbilical" which generally has towing cables, pipes for supplying gaseous fluids and/or liquids, electric power cables, signal transmission lines, etc.

The various subsets are towed parallel to each other and deflection means such as paravanes are used to keep them spaced laterally away from each other. Various depth control systems comprising for example platforms suspended on floats or platforms fitted with adjustableorientation ailerons and floats, allowing the sources to be submerged to selected depths are provided. Such deflection and depth control systems are described for example in French Patents 2,397,974, 2,240,478, and 2,523,542.

It is easy to measure the longitudinal distance separating the various sources along a given umbilical. However, it is far more difficult to determine exactly the actual distance of each source from the trajectory of the ship as it sails as well as its depth at the time when, the cruising speed having stabilized and the emission-reception system having assumed a stable disposition in the water, the seismic prospecting operation can commence. However, the condition of the sea, the currents, and the towing conditions may change, thus changing the actual disposition of the emission-reception array from one series of emissions to another. As a result, the signature and/or the directional diagram of the array are different for an identical triggering chronology.

The recordings obtained from these emissions are made more legible, in classical fashion, by correlation between the signals picked up by the reception device and the overall "signature" of the system. To determine the latter at all points in space, it is necessary to combine the individual signatures of each of the sources in a particular fashion, taking into account their relative disposition with respect to each other. A first method, described in published French Patent Application No. 2,582,107, consists of establishing a prior catalog containing the signatures of each of the sources of the emission system triggered separately, for a large number of values of parameters involved in the operation of the sources, particularly the immersion depth, and, in operation, taking into account the actual values of the parameters measured at the times of the "shots," combining the corresponding signatures taken from the catalog, possibly corrected, such as to reconstitute by synthesis the overall signature to infinity in all directions in space.

The overall signature of the emission system can also be obtained by measuring the signature of each of the sources of the emission system in the vicinity of the latter and combining them after correcting each one for operating interactions. The corrections made to the signatures depend closely on the relative disposition of the various sources with respect to each other. One method of this type is described for example in published European Patent Application No. 66,423.

The method according to the invention gives precise information on the geometry of a multisource seismic emission system whatever its configuration, and hence permits implementation of former signature reconstitution methods.

The method comprises the sinking of several pickups at specific distances from the various sources. It is characterized by comprising isolated triggering of a first seismic source, detection by the pickups of acoustic waves coming from the triggered seismic source, repetition of the two above stages successively for each of the seismic sources of the emission system, measurement, from the detected signals, of the values assumed by at least one parameter and which are representative of the distance traversed by the acoustic waves from each of the sources triggered sequentially to the various pickups, and the combination of the values of the various measured parameters such as to determine the relative positions of the various seismic sources with respect to each other.

The method may comprise measuring the immersion depth of several seismic sources of the emission system and determination of the coordinates of all the seismic sources with respect to each other.

It may thus comprise sinking at least one reference pickup at a predetermined fixed distance from the ship, determination of the successive values assumed by the measured parameter when the various seismic sources are triggered, and calculation of the position of the various seismic sources relative to the reference pickup(s).

The method may also comprise positioning of at lest one pickup in a fixed position with respect to an object towed by the ship, a seismic cable for example, determination of the successive values assumed by the representative parameter when the various seismic sources are successively triggered, and calculation of the positions of the various seismic sources relative to the pickup associated with the object.

The parameter representing distance may be the propagation time of the acoustic waves or the phase shift of the waves picked up by comparison with the waves emitted.

Other characteristics and advantages of the method will emerge from the description of one embodiment provided as a non-limitative example, with reference to the attached drawings where:

Figure 1:
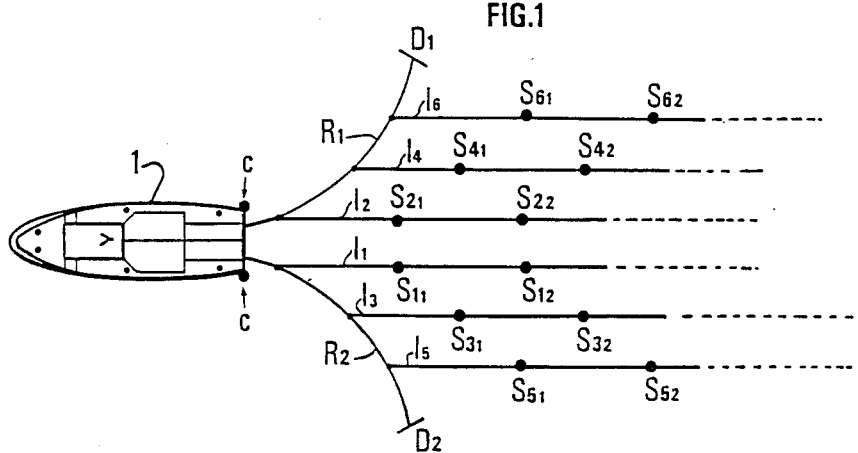
FIG. 1 represents a schematic top view of one arrangement of the various seismic sources of an emission system towed by a ship.
Figure 2:
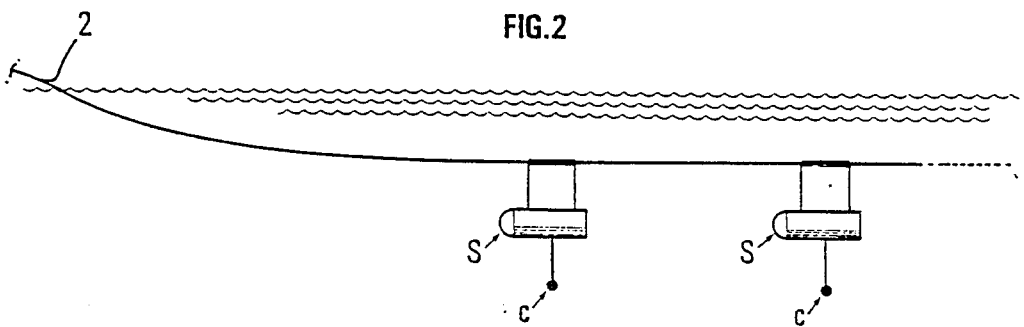
FIG. 2 represents, very schematically, two sources aligned along the same "umbilical"

An emission system described as an example has, according to FIG. 1, several lines of sources $l_1, l_2, \ldots l_6$ deployed behind a ship 1 which is towing them. Each line has several sources S connected by a connecting assembly or "umbilical" 2 (FIG. 2) which consists of towing cables, pipes carrying compressed gas or pressurized liquid necessary for operation of the sources, particularly air guns or water guns, electric power cables, signal transmission lines, etc.

Deployment of the sources is effected by fastening the towing cables associated with each line of seismic sources ($l_1$ to $l_6$) to one or two cables $R_1, R_2$ fastened to the ship and offset laterally with respect to the lengthwise axis of the latter. The lateral spacing between the cables $R_1$ and $R_2$ is created by paravanes of a known type attached to their ends. The divergent arrangement described in French Patent No. 2,523,542 may be used, for example.

The method according to the invention involves the use of pickups (C) disposed in the immediate vicinity of each of the seismic sources, 1 meter above or below for example, as shown. Such a pickup, known as a proximity pickup, is generally used to detect the moment of actual triggering of a seismic source or to pick up the shape of the pulse it emits (signature).

Figure 3:
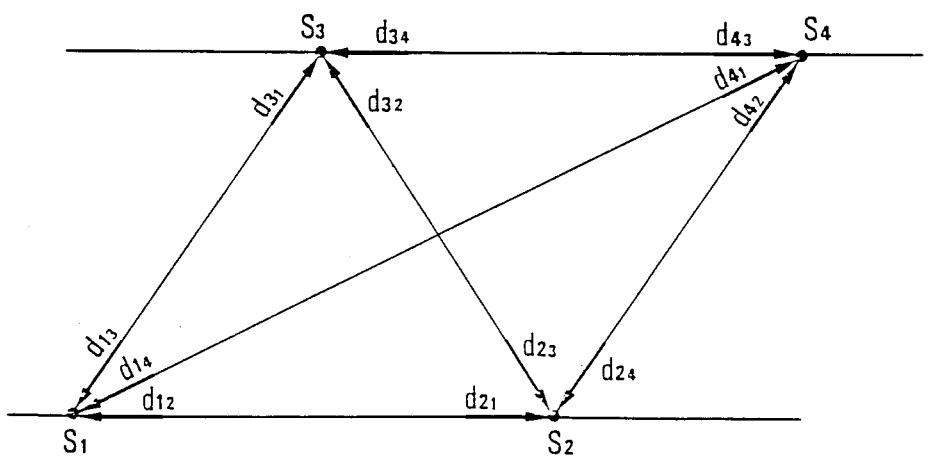
FIG. 3 represents schematically the various acoustic paths measured between two lines of sources each.

The method involves triggering a first seismic source of an emission system and detection by pickups C, associated respectively with other sources, of at least one parameter representing the distance traversed by the acoustic waves coming from the triggered seismic source. To facilitate representation, four sources $S_1, S_2, S_3$, and $S_4$ are shown in FIG. 3. When source $S_1$ has been triggered, pickups C detect the acoustic waves which are propagated to the other sources $S_2, S_3, S_4$. Since the rate of propagation of the waves in water is known, it is possible, by measuring the delays in the signals picked up by comparison with the signals emitted, to measure the distance $d_{12}, d_{13}, d_{14}$ separating source S1 from sources $S_2, S_3$, and $S_4$.

The signals detected by the various pickups C are transmitted to an acquisition system located on the ship (and not shown) by transmission lines associated with the connecting "umbilicals" 2, and recorded. An independent acquisition system or the on-board seismic laboratory can be used. The preceding operation is then repeated for the other sources $S_2, S_3$, and $S_4$. Since they are each triggered separately, the arrival at pickups C, associated with the other sources, of the acoustic waves it emits is detected and the signals received are transmitted to the acquisition system on the ship.

When all the seismic sources of the emission system have been successively activated and all the signals detected have been recorded, various corrections are made to account for the fact that each seismic source does not altogether coincide with the associated proximity pickup C and also to account for the true location of the emission center of the source triggered. In the case of an air gun which releases a certain volume of gas under pressure into the water, the emission center will be the center of the bubble which implodes, producing acoustic waves.

To facilitate exact detection of the moment of arrival of the acoustic waves, it is preferable to establish a correlation between the signal produced by each pickup C in response to the acoustic waves received with the corresponding emitted signal as detected by pickup C associated with the triggered source.

Once the corrected time intervals have been determined, as many sets of distance values exist as their are seismic sources. Source $S_2$ is associated with distances $d_{21}, d_{23}$, and $d_{24}$ separating it from sources $S_1, S_3$, and $S_4$. Other triplets of values $d_{32}, D_{32}$, and $D_{34}$ on the one hand and $d_{41}, d_{42}$, and $d_{43}$ on the other hand are associated respectively with sources $S_3$ and $S_4$.

A known method of triangulation such as the least squares method, well known to specialists, is then used to determine the relative coordinates of all the sources with respect to each other.

Determination of the positions of all the sources with respect to the ship is possible if one or more pickups C is/are associated with the ship (FIG. 1). Thus, with each triggering of the seismic source, at least one measurement is available for the distance separating the source from the ship. With two pickups C in fixed positions with respect to the ship, the coordinates of all the seismic sources of the emission system can be determined.

It is thus possible to determine the position of the emission system relative to other objects, particularly the head of a seismic cable also towed by the ship. Other pickups contained in the head sections of the cable will then be used to receive the pulses coming successively from the various sources.

If the seismic sources of the emission system have not sunk to the same depth, their respective immersion depths will be measured and transmitted to the acquisition system. Processing of the telemetric data and the depth values allows the spatial coordinates of all the sources to be determined.

Measurement of the immersion depths is advantageously effected by using the proximity pickups of various seismic sources in the manner shown in the aforementioned published French Patent Application 2,582,107. Each proximity pickup is associated with an amplification system whose gain may assume two very different gain values, the first for measuring the immersion depth and a second, with less gain, to detect acoustic waves coming from sequentially activated sources.

The method according to the invention can be worked in conjunction with that described in the aforementioned patent application relative to determination of the overall long-distance "signature" of a multisource emission system. This overall signature is obtained by establishing a catalog of the particular signatures of all the sources triggered one after the other, these signatures being detected by proximity pickups such as pickups C.

It would not be outside the scope of the invention to replace the measurement of time and propagation of acoustic waves by that of the phase shift of the signals received by the various proximity pickups with respect to the signals successively emitted by each of the sources. This alternative may be applied in particular to vibrating sources.

It would also not be outside the scope of the invention to use a different number of pickups from the number of seismic sources. A given pickup could be associated for example with several sources provided the distances separating it from the sources are properly determined. In the same way as above, calculation of the inter-source distance is done after introducing corrections to take into account the actual distance of each pickup from the associated seismic sources.

I claim:

1. A method for determining a geometrical configuration in water of a seismic wave emission source array comprising a plurality of seismic sources towed in immersion by a ship and distant from one another, with each source having in close proximity thereto and associated therewith a proximity pick-up sensor for acoustic waves, said method comprising the steps of:

triggering a first one of said plurality of seismic sources for generating a seismic signal;

detecting said generated seismic signal after propagation through water by means of said proximity pick-up sensors associated with others of said seismic sources;

measuring parameters of said detected acoustic signal representative of distance between said triggered seismic source and said proximity pick-up sensors respectively;

repeating the three previous steps successively for others of said seismic sources of the array; and determining the relative positions of the different seismic sources of said array with respect to one another by multiple acoustic triangulations using a combination of said parameters representative of distances.

2. A method as claimed in claim 1 including:

measuring immersion depth of a plurality of seismic sources of said array; and determining the coordinates of all the seismic sources with respect to at least one of said sources whose immersion depth has been measured.

3. A method as claimed in claim 2 also including disposing at least one proximity pick-up sensor in a fixed known position with respect to the ship and measuring propagation times to said fixed pick-up sensor of acoustic waves transmitted successively from said acoustic sources of the array and determining a relative position of said acoustic sources with respect to said fixed pick-up sensor.

4. A method as claimed in claim 1 wherein said measuring step includes measuring propagation times of acoustic waves between each successively triggered seismic source and said acoustic pick-up sensors.

5. A method as claimed in claim 1 wherein said measuring step includes measuring phase differences between acoustic waves received at said different acoustic pick-up sensors from each said successively triggered seismic source.

6. A method as claimed in claim 2 wherein each of said proximity pick-up sensors is capable of detecting acoustic waves and measuring immersion depth of the associated seismic source.

7. A method as claimed in claim 3 wherein a plurality of proximity pick-up sensors are in different known fixed positions with respect to said ship.

8. A method as claimed in claim 1 comprising:

disposing at least one fixed pick-up sensor in a known position with respect to an object towed by the ship;

determining successive values of said parameters of acoustic signals sensed by said fixed sensor associated with the object when said seismic sources are successively triggered; and computing a position of the different seismic sources of the array with respect to said fixed pick-up sensor.

9. A method as defined in claim 8 wherein said object is a seismic streamer.

10. A method as defined in claim 2 comprising:

disposing at least one fixed pick-up sensor in a known position with respect to an object towed by the ship;

determining successive values of said parameters of acoustic signals sensed by said fixed sensor associated with the object when said seismic sources are successively triggered; and computing a position of the different seismic sources of the array with respect to said fixed pick-up sensor.

11. A method as claimed in claim 3 comprising:

disposing at least one fixed pick-up sensor in a known position with respect to an object towed by the ship;

determining successive values of said parameters of acoustic signals sensed by said fixed sensor associated with the object when said seismic sources are successively triggered; and computing a position of the different seismic sources of the array with respect to said fixed pick-up sensor.

* * * * *